Figure 1:
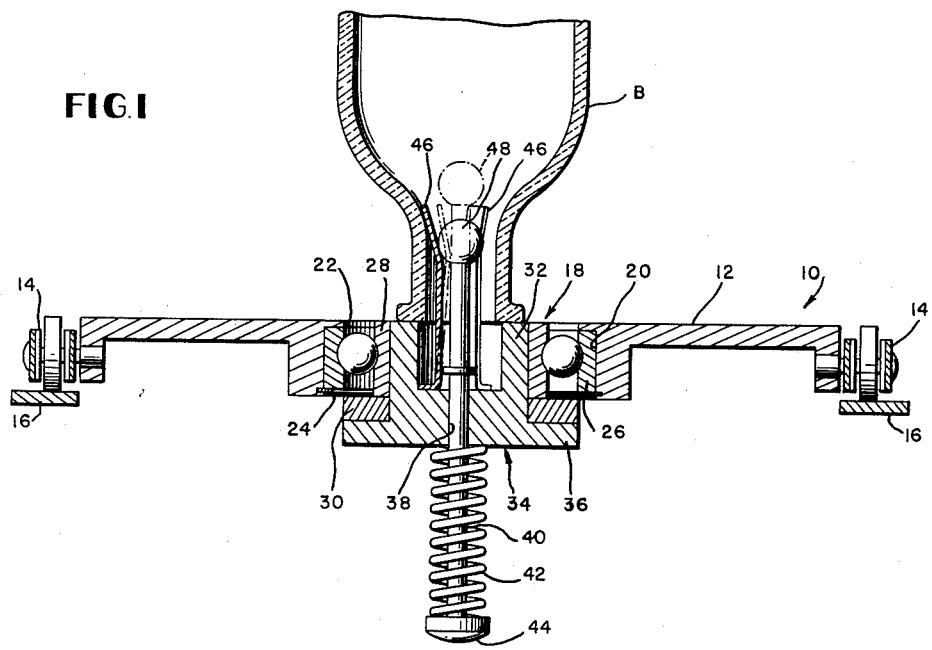

April 2, 1963

K. G. LUSHER 3,083,813

ARTICLE HANDLING APPARATUS

Filed Oct. 27, 1960

INVENTOR

KENNETH G. LUSHER

BY *W. A. Schaich and Charles S. Lynch*

ATTORNEYS 3,083,813
ARTICLE HANDLING APPARATUS
Kenneth G. Lusher, Perrysburg, Ohio, assignor to Owens-Illinois Glass Company, a corporation of Ohio
Filed Oct. 27, 1960, Ser. No. 65,387
7 Claims. (Cl. 198—131)

This invention relates to article handling apparatus, and more particularly to apparatus for handling articles such as bottles, tumblers, etc. during certain portions of their manufacturing processes.

The invention is specifically directed toward article handling apparatus in which individual chucks are provided to maintain articles such as glass or plastic bottles or containers in position upon a conveyer which conveys the articles through successive work stations at which various processes are performed upon the article. During many of the operations, it is desirable to rotate the article to assure uniform exposure of the exterior of the article. In view of the many and varied conditions to which chucks employed for the foregoing purpose are exposed, the useful life of such chucks is relatively short and hence frequent replacement of the chucks is required. Since the chuck is mounted upon a moving conveyer which, depending upon the number of operations to be performed upon the article, may be of considerable extent, the shutting down of the entire process in order to remove a chuck from the conveyer and replace it with a new chuck results in a substantial loss in production.

It is a primary object of the invention to provide a conveyer mounted chuck assembly in which chucks may be easily replaced upon the conveyer while the conveyer remains in operation.

Other objects and features of the invention will become apparent by reference to the following specification and to the drawings.

Figure 2:
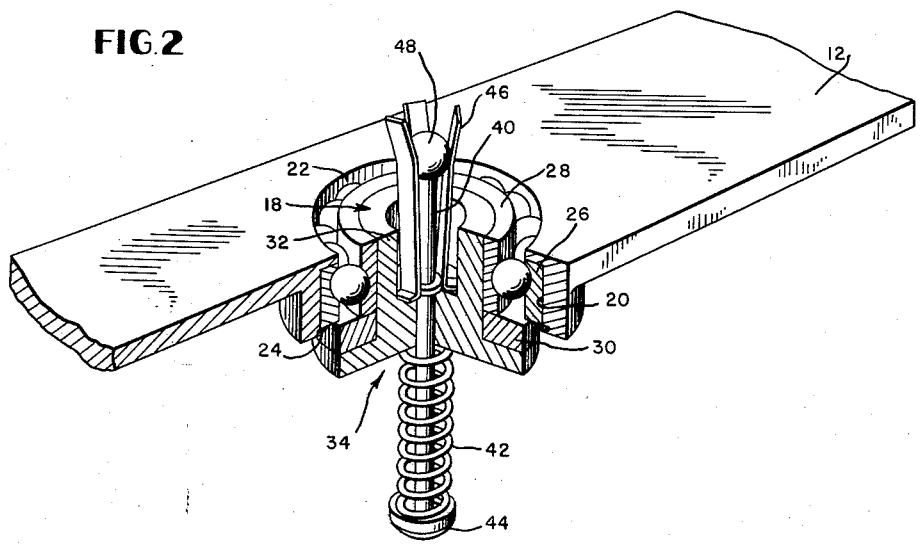

In the drawings:

FIG. 1 is a cross-sectional view taken on a vertical plane passing centrally through one form of apparatus embodying the invention; and FIG. 2 is a perspective view of the structure of FIG. 1 with certain parts omitted or shown in cross-section.

In the drawings, one exemplary form of the invention is disclosed as an assembly adapted to convey articles such as bottle B through a series of work stations at which various steps in the manufacturing process are performed. A typical process of this type is the production of a plastisol coated bottle in which the bottle is conveyed through work stations where it is successively primed, preheated, dipped in plastisol, cured and cooled. The structure disclosed in the drawings includes a conveyer designated generally 10 upon which a plurality of individual bottle chucks of the internal expanding type are mounted. Conveyer 10 is a platform conveyer in which a plurality of transversely extending support members 12 are connected at their opposite sides to roller chains 14 which are driven by any suitable means, not shown, along a path defined by fixed tracks or guideways partially illustrated at 16.

A ball bearing designated generally 18 is seated within a bore 20 which passes through support member 12 in any suitable manner as by forming a reduced diameter section 22 at one end of bore 20 and seating a split ring 24 in support member 12 in engagement with the opposite side of the outer race 26 of bearing 18. Thus, the inner race 28 of bearing 18 is free to rotate relative to support member 12 within bore 20.

Inner race 28 is constructed of a ferro-magnetic material and an annular permanent magnet 30 is disposed in face to face engagement with one end of inner race 28 and magnetically held in position against race 28.

The internal diameter of inner race 28 and annular magnet 30 is preferably the same so that a cylindrical neck portion 32 of a chuck body, designated generally 34, may be slideably received within the central passage of the bearing and annular magnet. At its lower end, a radially projecting flange 36 on chuck body 34 projects outwardly beneath the lower end of annular magnet 30. Chuck body 34 is constructed of a ferro-magnetic material and annular magnet 30 magnetically couples chuck body 34 to inner race 28 of bearing 18. Chuck body 34 may thus rotate freely within support member 12.

Chuck body 34 is formed with an axially extending central bore 38 within which is slideably received an actuating rod 40. A compression spring 42 is seated between the lower surface of flange 36 of the chuck body and a button 44 fixed on the lower end of actuating rod 40.

A plurality of symmetrically disposed leaf spring jaw members 46 are mounted at their lower ends within neck portion 32 of the chuck body and project axially upwardly. The normal or relaxed position of jaw members 46 is indicated in dotted line in FIG. 1 and corresponds to the contracted or article releasing position of the jaw members. A ball-like expanding member 48 is mounted upon the upper end of actuating rod 40 and is normally biased by compression spring 42 to the full line position shown in FIG. 1 in which member 48 forces jaw members 46 radially outwardly to internally clamp the neck portion of a bottle in position upon the upper end of chuck body 34. When actuating rod 40 is pushed upwardly against the action of spring 42 to elevate expanding member 48 to the broken line position of FIG. 1, the resilient jaw members spring radially inwardly to the broken line position of FIG. 1 to permit a bottle B to be placed on or removed from the chuck assembly.

The chuck assembly is held upon support member 12 only by the magnetic coupling exerted by annular magnet 30 and hence, when it is necessary to remove or replace the chuck assembly, the assembly as a whole may be easily removed from support member 12 merely by pulling the assembly downwardly through inner race 28 of bearing 18. In normal operation of the chuck, the magnetic coupling between chuck body 34 and inner bearing race 28 is not disturbed since the only force tending to release the chuck body from bearing 28 is the weight of the chuck and that of a bottle supported by the chuck. Actuation of actuating rod 40 to operate the chuck exerts a force on the chuck body only during the releasing movement and this force is applied to the chuck body in a direction assisting magnet 30 to maintain the coupling between chuck body 34 and bearing 18.

The chuck assembly and bottle are supported for free rotation relative to support member 12 by bearing 18 and may be rotated relative to the support member either manually or by any suitable means such as a moving belt frictionally engaging the side of flange 36.

While one embodiment of the invention has been described, it will be apparent to those skilled in the art that the disclosed embodiment may be modified. Therefore, the foregoing description is to be considered exemplary rather than limiting and the true scope of the invention is that defined in the following claims.

I claim:

1. Article handling apparatus comprising a support assembly having a bore therethrough, an article supporting chuck assembly including a chuck body having a neck portion coaxially received within said bore, a flange projecting radially from said chuck body at one side of said support assembly, article supporting means on said chuck body projecting axially from said neck portion at the other side of said support assembly, and magnetic coupling means for magnetically coupling said flange of said chuck body to said support assembly to releasably mount said chuck assembly thereon.

2. Article handling apparatus comprising a support assembly having a bore therethrough, bearing means mounted upon said support assembly and including an annular inner member mounted for rotation relative to said support member coaxially within said bore, an article supporting chuck assembly including a chuck body having a neck portion coaxially received within said inner member of said bearing means, a radially projecting flange on said chuck body extending outwardly from said neck portion into radially overlapping relationship with said inner member, and magnetic coupling means engaged between said inner member and one side of said flange to magnetically couple said chuck body to said inner member to support said chuck assembly upon said support assembly for rotation relative to said support assembly.

3. Article handling apparatus comprising a support assembly having a bore therethrough, an annular magnetic member, means mounting said magnetic member upon said support member for rotation relative to said support member in coaxial relationship with said bore, an article supporting chuck assembly including a chuck body having a neck portion coaxially received within said magnetic member, and a radially projecting flange of ferro-magnetic material on said chuck body projecting radially from said neck portion in face to face engagement with one end of said annular magnetic member to magnetically support said chuck assembly upon said support assembly for rotation relative to said support assembly.

4. Article handling apparatus as defined in claim 3 wherein said mounting means comprises a bearing assembly having an outer race seated within said bore and an inner race rotatably supported within said outer race, said inner race being constructed of a ferro-magnetic material and being disposed in face to face engagement with the other end of said annular magnetic member.

5. Article handling apparatus comprising a support assembly having a bore therethrough, a chuck assembly including a chuck body having a neck portion coaxially received within said bore, a radially projecting flange on said chuck body at one side of said support assembly, a plurality of radially expansible chuck jaw members projecting axially from said neck portion at the other side of said support assembly, a chuck actuating member slideably received within said chuck body and extending axially through said flange and said neck portion, an expanding member on said actuating member engageable between said jaw members and operable upon movement of said expanding member toward said flange portion to expand said jaw members, a compression spring engageable between said flange and the other end of said actuating member biasing said expanding member toward said flange portion, and a magnetic member disposed between said flange portion and said one side of said support assembly to magnetically couple said chuck body to said support assembly.

6. Article handling apparatus comprising a chuck body having a vertically disposed cylindrical neck portion, an outwardly projecting radial flange on said body at one end of said neck portion, said body having a central bore extending axially therethrough, a plurality of resilient jaw members mounted on said body at symmetrically disposed positions about said bore and projecting upwardly from the upper end of said neck portion, the upper ends of said jaw members being biased radially inwardly, an expanding member slideably supported in said central bore for axial movement between an actuating position wherein said member is engaged between the upper ends of said jaw members to radially expand said jaw members and a release position wherein said expanding member is disengaged from the upper ends of said jaw members to permit said jaw members to spring radially inwardly to an article releasing position, resilient means engaged between said chuck body and said expanding member biasing said expanding member toward said actuating position, support means including a rotatable annular support member having a central opening therethrough slideably receiving said neck portion, and magnetic coupling means engaged between said flange and one end of said annular support member to magnetically couple said chuck body to said annular support member, the biasing force exerted by said resilient means upon said chuck body acting in a direction to urge said flange and said magnetic means toward said one end of said annular support member.

7. Article handling apparatus comprising a chuck body having a vertically disposed cylindrical neck portion, an outwardly projecting radial flange on said body at the lower end of said neck portion, said body having a central bore extending axially therethrough, a plurality of resilient jaw members mounted on said body at symmetrically disposed positions about said bore and projecting upwardly from the upper end of said neck portion, the upper end of said jaw members being biased radially inwardly, an actuating member slideably supported in said central bore for axial movement relative to said chuck body, expanding means on the upper end of said actuating member movable with said actuating member between a lowered actuated position wherein said expanding means is engaged between the upper ends of said jaw members to radially expand said jaw members and an elevated release position wherein said expanding means is disposed above the upper ends of said jaw members to permit said jaw members to spring radially inwardly, a compression spring engaged between the lower end of said body and said actuating member biasing said actuating member to said lowered position, support means including an annular support member mounted for rotation about a vertical axis and having a central axial opening therethrough receiving said neck portion, said flange at said lower end of said neck portion being disposed below the lower end of said annular support member, and an annular magnetic member engaged between said flange and the lower end of said annular support member magnetically coupling said chuck body to said annular support member.

References Cited in the file of this patent

UNITED STATES PATENTS

| | | |
|---|---|---|
| 791,497 | Putnam | June 6, 1905 |
| 2,103,681 | Klaucke | Dec. 28, 1937 |
| 2,223,846 | Dostal | Dec. 3, 1940 |
| 2,336,401 | James | Dec. 7, 1943 |
| 2,344,000 | Read | Mar. 14, 1944 |
| 2,360,928 | Beechlyn | Oct. 24, 1944 |
| 2,818,987 | Krupp et al. | Jan. 7, 1958 |
| 2,829,918 | Stoakes et al. | Apr. 8, 1958 |